United States Patent
Lee et al.

(10) Patent No.: US 7,018,689 B2
(45) Date of Patent: Mar. 28, 2006

(54) HEAT-SHRINKABLE POLYESTER FILM

(75) Inventors: Junggyu Lee, Anyang-si (KR); Jonghyuk Eun, Suwon-si (KR); Namil Kim, Suwon-si (KR); Sangil Kim, Suwon-si (KR); Yongin Park, Euiwang-si (KR); Changju Lee, Suwon-si (KR)

(73) Assignee: SKC Limited, (KR)

( * ) Notice: Subject to any disclaimer, the term of this patent is extended or adjusted under 35 U.S.C. 154(b) by 0 days.

(21) Appl. No.: 10/492,825

(22) PCT Filed: Nov. 2, 2002

(86) PCT No.: PCT/KR02/02043

§ 371 (c)(1),
(2), (4) Date: Apr. 13, 2004

(87) PCT Pub. No.: WO03/037967

PCT Pub. Date: May 8, 2003

(65) Prior Publication Data

US 2004/0265607 A1  Dec. 30, 2004

(30) Foreign Application Priority Data

Nov. 2, 2001  (KR) .................. 10-2001-0068138

(51) Int. Cl.
B32B 27/06 (2006.01)
B32B 27/08 (2006.01)
B32B 27/20 (2006.01)
B32B 27/36 (2006.01)

(52) U.S. Cl. ............ 428/34.9; 428/213; 428/215; 428/219; 428/332; 428/334; 428/335; 428/336; 428/339; 428/340; 428/341; 428/480; 428/482; 428/910; 528/302; 528/304; 528/308; 528/308.6; 528/308.7

(58) Field of Classification Search ............ 428/34.9, 428/480, 910; 528/302, 307, 308, 308.1, 528/308.6; 525/437, 444
See application file for complete search history.

(56) References Cited

U.S. PATENT DOCUMENTS

| | | | | | |
|---|---|---|---|---|---|
| 5,059,470 | A | * | 10/1991 | Fukuda et al. | 428/142 |
| 5,340,624 | A | * | 8/1994 | Sublett | 428/35.8 |
| 5,424,121 | A | * | 6/1995 | Murakami et al. | 428/337 |
| 5,824,398 | A | * | 10/1998 | Shih | 264/211 |
| 6,231,958 | B1 | * | 5/2001 | Kim et al. | 528/272 |
| 6,383,627 | B1 | * | 5/2002 | Hashimoto et al. | 428/332 |
| 6,617,006 | B1 | * | 9/2003 | Kubo et al. | 428/141 |
| 6,663,928 | B1 | * | 12/2003 | Ito et al. | 428/35.1 |
| 6,720,085 | B1 | * | 4/2004 | Ito et al. | 428/480 |
| 6,761,966 | B1 | * | 7/2004 | Ito et al. | 428/221 |
| 6,818,312 | B1 | * | 11/2004 | Lee et al. | 428/447 |
| 2001/0038920 | A1 | * | 11/2001 | Hashimoto et al. | 428/480 |
| 2002/0150780 | A1 | * | 10/2002 | Ito et al. | 428/480 |

FOREIGN PATENT DOCUMENTS

| | | | |
|---|---|---|---|
| JP | 04-278330 | * | 10/1992 |
| JP | 04-278346 | * | 10/1992 |
| JP | 2000-000949 | * | 1/2000 |
| JP | 2000-094513 | * | 4/2000 |
| JP | 2002-091316 | * | 3/2002 |
| KR | 2001-018266 | * | 3/2001 |
| KR | 2001-045907 | * | 6/2001 |
| KR | 2001-045908 | * | 6/2001 |
| KR | 2002-0008899 | * | 2/2002 |

* cited by examiner

*Primary Examiner*—Vivian Chen
(74) *Attorney, Agent, or Firm*—Anderson Kill & Olick, PC

(57) ABSTRACT

A heat-shrinkable polyester film comprising a polyester base film and a coat layer formed on one or both sides of the polyester base film, said coat layer comprising a copolymerised polyester having carboxyl group terminals and Tg in the range of 70 to 80;É, exhibits superior properties suitable for labeling or shrink-wrapping containers.

16 Claims, No Drawings

HEAT-SHRINKABLE POLYESTER FILM

FIELD OF THE INVENTION

The present invention relates to a heat-shrinkable polyester film, more particularly, to a heat-shrinkable polyester film for use in labeling, wrapping containers and the like, which has improved performance characteristics.

BACKGROUND OF THE INVENTION

Heat shrinkable films have been extensively used, e.g., for labeling bottles, batteries or electrolytic condensers, and wrapping containers and other products. Such heat-shrinkable films are formed of polyvinyl chloride, polystyrene or polyester, and they are required to have good sealing and shrinking properties as well as good heat resistance, chemical resistance, weatherability and printability.

Conventional heat-shrinkable films formed of polyvinyl chloride or polystyrene have relatively poor heat resistance, chemical resistance, weather resistance and heat-shrinking properties. In particular, polyvinyl chloride-based heat-shrinkable films recently become increasingly disfavored because they emit toxic pollutants when incinerated. Polystyrene films, on the other hand, have the problem of poor printability, requiring a special purpose ink. Polystyrene films also tend to undergo spontaneous shrinkage during long-term storage.

Heat-shrinkable polyester films formed of polyethylene terephthalate (PET) have satisfactory heat resistance, chemical resistance, weatherability and shrinking properties. However, the shrinkage stress and shrinkage ratio of a PET film are generally unacceptably high, giving non-uniform shrink-wrappings with consequential distortion of images printed thereon.

Japanese Laid-open Patent Publication Nos. 63-139725, 7-53416, 7-53737, 7-216107, 7-216109 and 9-254257 disclose that the shrinkage uniformity of a PET film can be improved by blending a polyethylene terephthalate with a polybutylene terephthalate in a particular ratio, or by copolymerizing a dicarboxylic acid component such as terephthalic acid and isophthalic acid with a diol component such as ethylene glycol and 1,4-cyclohexanedimethanol. Although this heat-shrinkable film shows some improvement in terms of uniform shrinkage, it is difficult in handle due to its tendency to gather static electricity, unacceptably low $T_g$ and poor slipping property.

SUMMARY OF THE INVENTION

Accordingly, it is a primary object of the present invention to provide a heat shrinkable film having improved thermal shrinkage property, adhesive property, water resistance, printability, slipping property and sticking resistance.

The above object of the invention can be accomplished by providing a heat-shrinkable polyester film comprising a polyester base film and a coat layer formed on one or both sides of the polyester base film, wherein said coat layer comprising a polyester copolymer having carboxyl group terminals and $T_g$ in the range of 70 to 80° C.

DETAILED DESCRIPTION OF THE INVENTION

Heat-shrinkable polyester films in accordance with the present invention comprise a coat layer containing a polyester copolymer having carboxyl group terminals and $T_g$ in the range of 70 to 80° C.

The polyester copolymer in accordance with the present invention may be prepared by copolymerizing a dicarboxylic acid component, for example, terephthalic acid or its ester, isophthalic acid or its ester, 2,6-naphthalenedicarboxylic acid or its ester, sebacic acid, adipic acid, 5-sulfoisophthalic acid, trimellitic acid, oxalic acid, maleic acid, succinic acid, glutaric acid, pimelic acid, azelaic acid, or pyromellitic acid with a diol component, for example, ethylene glycol, 1,3-propanediol, diethylene glycol, hexanediol, 2,2-(4-oxyphenol)propanediol derivatives, xylene glycol, triethylene glycol, poly-tetramethylene glycol, 2,2'-oxybis(ethanol), or 2,2-dimethyl-1,3-propanediol.

Such polyester copolymer has carboxyl group terminals and its $T_g$ is in the range of 70 to 80° C., preferably 73 to 78° C. In case that $T_g$ is below 70° C., container labels may stick together during the container washing and filling process, while the coated layer may degrade during shrink-wrapping when $T_g$ is above 80° C.

The coat layer used in the present invention may further comprise an inorganic lubricant such as silica, alumina, titania, calcium carbonate, barium sulfate or a mixture thereof, preferably colloidal silica, for the purpose of improving slipping property. Preferably, the inorganic lubricant content is in the range of 0.1 to 0.5% by weight based on the polyester copolymer.

The polyester copolymer comprising the inorganic lubricant can be coated on one or both sides of the polyester base film. The coat layer may be applied on the surface of a polyester base film by means of a conventional coating method, for example, the gravure roll method, reverse gravure roll method, Meyer-bar method or knife coating method.

The thickness of the coat layer can be determined by measuring the amount of the coating composition. Preferably, the amount of the coating composition is in the range of 0.01 to 0.1 g/m$^2$, more preferably 0.02 to 0.08 g/m$^2$. If the amount of the coating material is less than 0.01 g/m$^2$, the film tends to become sticky. On the other hand, if the amount is more than 0.1 g/m$^2$, blocking may occur during the film takes up on a roll.

The polyester base film on which the coat layer is formed may be a conventional heat-shrinkable polyester film, preferably, a polyester copolymer which comprises terephthalic acid and glycol components. However, it is desirable that the polyester base film comprises trimethylene terephthalate repeating unit so as to improve the thermal shrinkage characteristics and the transparency thereof. The polyester base film preferably comprises 45 to 90% by mole of ethylene terephthalate repeating unit, 5 to 25% by mole of trimethylene terephthalate repeating unit and 5 to 30% by mole of dimethyl(-1,3-propylene)terephthalate repeating unit based on the total composition, respectively.

The content of the trimethylene terephthalate repeat unit is preferably in the range of 5 to 25% by mole based on the total composition. If said repeating unit content is less than 5% by mole, the shrinkage ratio in the transverse direction with respect to the major shrinkage direction may become excessively high, the spontaneous shrinkage ratio at below 50° C. becomes high, and the film transparency deteriorates, and if it is higher than 25% by mole, excessive crystallization may occur during drawing and the extent of shrinkage in the major shrinkage direction may become low.

The content of the ethylene terephthalate repeating unit is preferably in the range of 45 to 90% by mole based on the total composition. If the content of this repeating unit is less than 45% by mole, heat resistance and extendibility of the polyester film become poor, while if it is more than 90% by mole, the shrinkage ratio of the film may not be satisfactory and the adhesiveness becomes poor.

The content of the dimethyl(-1,3-propylene) terephthalate repeating unit is preferably in the range of 5 to 30% by mole based on the total composition. If said content is less than 5% by mole, sufficient thermal shrinkage cannot be achieved during a shrink-wrapping process, and the strength of a uniaxially drawn film in the transverse direction may become low, whereas, if it is more than 30% by mole, heat resistance and extendibility of the film may become poor.

In the manufacture of the polyester film, it is preferable to blend a polytrimethylene terephthalate and a polyethylene terephthalate with 2,2-dimethyl(-1,3-propane)diol-copolymerized polyester which is prepared by copolymerizing terephthalic acid or dimethyl terephthalate with a mixture of ethylene glycol and 2,2-dimethyl(-1,3-propane)diol.

In a preferred embodiment, the 2,2-dimethyl(-1,3-propane)diol copolymerized polyester comprises 15 to 25% by mole of dimethyl(-1,3-propylene) terephthalate repeating unit. If the content of dimethyl(-1,3-propylene) terephthalate repeating unit is less than 15% by mole, the heat shrinkage ratio may not be satisfactory, while if it is higher than 25% by mole, the film becomes excessively amorphous.

The intrinsic viscosity of the 2,2-dimethyl(-1,3-propane) diol copolymerized polyester is preferably 0.5 to 0.7. The intrinsic viscosities of polytrimethylene terephthalate and polyethylene terephthalate are preferably 0.7 to 0.95 and 0.5 to 0.65, respectively.

The polyester base film of the present invention may further comprise another copolymeric dicarboxylic acid component such as isophthalic acid and its ester, 2,6-naphthalenedicarboxylic acid and its ester, sebacic acid, adipic acid, 5-sulfoisophthalic acid, trimellitic acid, oxalic acid, maleic acid, succinic acid, glutaric acid, pimelic acid, azelaic acid and pyromellitic acid, while the diol component being ethylene glycol, 1,3-propanediol, diethylene glycol, hexanediol, 2,2-(4-oxyphenol)propanediol derivatives, xylene glycol, triethylene glycol, poly-tetramethylene glycol, 2,2'-oxybis(ethanol), 2,2-dimethyl(-1,3-propane)diol or a mixture thereof The polyester base film used in the present invention may contain additives such as a dispersant, antiblocking agent, lubricant, etc., in amounts that would not adversely affect the film properties.

A polyester resin useful for the base film may be synthesized through a conventional process such as direct esterification or interesterification. A polyester base film is prepared by melt extruding the polyester resin to form a molten sheet, cooling, solidifying the molten sheet, and uni- or twinaxially drawing the solidified sheet with a tenter.

In a preferred embodiment, the thickness of the inventive heat-shrinkable film may lie in the range of 12 to 125 μm.

The present invention is further described and illustrated in Examples, which are, however, not intended to limit the scope of the present invention.

SYNTHESIS EXAMPLES 1 THROUGH 6

A polyethylene terephthalate (A) having an intrinsic viscosity of 0.62 was synthesized by a known method, as follows.

100 parts by mole of dimethyl terephthalate and 140 parts by mole of 1,3-propanediol were placed in an autoclave equipped with a mixer and a distillation column, and tetrabutylene titanate (an interesterification catalyst) was added in an amount equivalent to 0.05% by weight based on dimethyl terephthalate. After removing methanol formed, the temperature was raised to 220° C. for further reaction. After the interesterification reaction was complete, trimethyl phosphate (a stabilizer) was added in an amount of 0.045% by weight based on dimethyl terephthalate, and antimony trioxide (a polymerization catalyst) was further added 10 minutes later in an amount of 0.02% by weight. After 5 minutes, the resulting product was transferred to a second reactor equipped with a vacuum unit, and reacted at 280° C. for about 180 minutes to attain a polytrimethylene terephthalate(B) having an intrinsic viscosity of 0.85.

100 parts by mole of dimethyl terephthalate, 110 parts by mole of ethylene glycol and 40 parts by mole of neopentyl glycol (2,2-dimethyl(-1,3-propane)diol) were placed in an autoclave equipped with a mixer and a distillation column, and manganese acetate (an interesterification catalyst) was added in an amount equivalent to 0.07% by weight based on dimethyl terephthalate. After removing methanol formed, the temperature was raised to 220° C. for further reaction. After the interesterification reaction was complete, trimethyl phosphate was added in an amount of 0.04% by weight based on dimethyl terephthalate. After 5 minutes, antimony trioxide and tetrabutylene titanate were added thereto in amounts of 0.035% by weight and 0.005% by weight based on dimethyl terephthalate, respectively, and stirred for 10 minutes. The resulting product was transferred to a second reactor equipped with a vacuum unit, and the pressure was slowly reduced while raising the temperature to 285° C. The temperature was maintained at that temperature for about 210 minutes, to obtain a copolymerized polyester (C) having an intrinsic viscosity of 0.60.

The polyesters A, B and C were mixed at various ratios, and each mixture was melted at 280° C., extruded, and cooled by a casting roller maintained at 20° C., to obtain an amorphous sheet. The amorphous sheet was uniaxially drawn at a drawing ratio of 3.6 in a tenter maintained at 80° C., to obtain a polyester base film having the thickness of 50 μm whose composition is shown in Table 1.

TABLE 1

| Synthesis | Content of Repeating Units (% by mole) | | |
|---|---|---|---|
| Example No. | Ethylene terephthalate | Trimethylene terephthalate | 2,2-dimethyl(-1,3-propylene) terephthalate |
| 1 | 51 | 25 | 24 |
| 2 | 61 | 25 | 14 |
| 3 | 66 | 20 | 14 |
| 4 | 75 | 14 | 11 |
| 5 | 82 | 10 | 8 |
| 6 | 88 | 5 | 7 |

SYNTHESIS EXAMPLE 7

A polyester resin was synthesized using a dicarboxylic acid component composed of 80% by mole of dimethyl terephthalate, 15% by mole of dimethyl isophthalate and 5% by mole of dimethyl 2,6-naphthalenedicarboxylate; and a diol component composed of 15% by mole of propanediol, 10% by mole of 2,2-dimethyl(-1,3-propane)diol, and 75% by mole of ethylene glycol. The resin was dried, melted at 280° C., extruded, and cooled with a casting roller maintained at 20° C., and the resulting amorphous sheet was uniaxially drawn with a tenter, to obtain a polyester base film.

EXAMPLE 1

50 parts by weight of 1,3-benzenedicarboxylic acid and 50 parts by weight of 2,2'-oxybis(ethanol) were placed in an autoclave equipped with a mixer and a distillation column, and manganese acetate (an interesterification catalyst) was added in an amount of 0.05 part by weight at 150° C. After removing water and methanol formed, the temperature was raised to 220° C. and maintained at that temperature for 120 minutes. After the interesterification reaction was complete, 0.02 part by weight of trimethyl phosphate was added. After 10 minutes, 0.02 part by weight of antimony trioxide was added thereto, and stirred for 10 minutes. The resulting product was transferred to a second reactor equipped with a vacuum unit, and the pressure was slowly reduced while raising the temperature to 280° C. The temperature was maintained at that temperature for about 140 minutes, to obtain a copolymerized polyester. The $T_g$ of the copolymerized polyester was 76° C. (measured using DSC (manufactured by Perkin-Elmer) at a temperature program rate of 10° C./minute).

The above copolymerized polyester (coating composition) was applied to one side of the polyester base film prepared in Synthesis Example 1 by Meyer bar coating and, then, dried to obtain a heat-shrinkable polyester film having a coat layer which amounted to 0.03 g/m² after drying.

EXAMPLES 2 THROUGH 6

The procedure of Example 1 was repeated except that the polyester base films prepared in Synthesis Examples 2 through 6 were used in place of the base film of Synthesis Example 1 in respective Examples.

EXAMPLE 7

The procedure of Example 1 was repeated except that 0.5 part by weight of colloidal silica was added to the copolymerized polyester for coating.

EXAMPLE 8

The procedure of Example 1 was repeated except that the coat layer amount was 0.02 g/m² after drying.

EXAMPLE 9

The procedure of Example 1 was repeated except that the coat layer amount was 0.05 g/m² after drying.

COMPARATIVE EXAMPLES 1 THROUGH 6

The procedure of Example 1 was repeated except that the polyester base films prepared in Synthesis Examples 1 through 6 were not coated with a copolymerized polyester.

COMPARATIVE EXAMPLE 7

The procedure of Example 1 was repeated except that WR901 (Japanese Synthesis Co. Ltd.,) having $SO_3$ terminal groups and $T_g$ of 64° C. was coated on one side of the polyester base film, in an amount of 0.03 g/m² after drying.

COMPARATIVE EXAMPLE 8

The procedure of Example 1 was repeated except that an acrylic resin containing a conventional melamine hardener was coated on the polyester base film in an amount of 0.05 g/m² after drying.

COMPARATIVE EXAMPLE 9

The procedure of Example 1 was repeated except that a conventional aqueous polyurethane was coated on the polyester base film in an amount of 0.03 g/m² after drying.

Performance Test I

The performances of the heat-shrinkable polyester films manufactured in Examples 1 through 9 and Comparative Examples 1 through 9 were measured for the following properties. The results are shown in Table 2.

(1) Adhesive Properties 1,3-dioxolane was applied on the surface of a sample film and, then, the film was covered with another film sample. For about 10 seconds, the films were pulled apart from each other. The adhesive property was evaluated according to the following criteria:

○: stick to each other when stretched.

Δ: peeled with adhering trace x: easily detached without adhering trace.

(2) Water Resistance & Sticking Properties

Two sheets of a sample film were washed in flowing water at room temperature for 30 minutes, dried in air, pressed together under a heat gradient (28 psi, 10 sec and 100 to 140° C., step: 10° C.), and they were pulled apart from each other. The sticking property was evaluated according to the following criteria:

○: easily detached.

Δ: peeled with adhering trace x: stretched or stick to each other until broken.

(3) Slipping Properties (Frictional Coefficient)

The static frictional coefficient was measured under a 200 g load in accordance with ASTM D1894.

TABLE 2

| Example No. | Adhesive properties | Static frictional coefficient | Water Resistance | | | | | sticking properties | | | | |
|---|---|---|---|---|---|---|---|---|---|---|---|---|
| | | | 100° C. | 110° C. | 120° C. | 130° C. | 140° C. | 100° C. | 110° C. | 120° C. | 130° C. | 140° C. |
| Ex. 1 | ○ | 0.65 | ○ | ○ | ○ | ○ | ○ | ○ | ○ | ○ | ○ | ○ |
| Ex. 2 | ○ | 0.64 | ○ | ○ | ○ | ○ | ○ | ○ | ○ | ○ | ○ | ○ |
| Ex. 3 | ○ | 0.65 | ○ | ○ | ○ | ○ | ○ | ○ | ○ | ○ | ○ | ○ |
| Ex. 4 | ○ | 0.65 | ○ | ○ | ○ | ○ | ○ | ○ | ○ | ○ | ○ | ○ |
| Ex. 5 | ○ | 0.66 | ○ | ○ | ○ | ○ | ○ | ○ | ○ | ○ | ○ | ○ |
| Ex. 6 | ○ | 0.65 | ○ | ○ | ○ | ○ | ○ | ○ | ○ | ○ | ○ | ○ |

TABLE 2-continued

| Example No. | Adhesive properties | Static frictional coefficient | Water Resistance | | | | | sticking properties | | | | |
|---|---|---|---|---|---|---|---|---|---|---|---|---|
| | | | 100° C. | 110° C. | 120° C. | 130° C. | 140° C. | 100° C. | 110° C. | 120° C. | 130° C. | 140° C. |
| Ex. 7 | ○ | 0.50 | ○ | ○ | ○ | ○ | Δ | ○ | ○ | ○ | ○ | Δ |
| Ex. 8 | ○ | 0.45 | ○ | ○ | ○ | ○ | ○ | ○ | ○ | ○ | ○ | ○ |
| Ex. 9 | ○ | 0.42 | ○ | ○ | ○ | ○ | ○ | ○ | ○ | ○ | ○ | ○ |
| Com. Ex. 1 | ○ | 0.75 | X | X | X | X | X | X | X | X | X | X |
| Com. Ex. 2 | ○ | 0.77 | X | X | X | X | X | X | X | X | X | X |
| Com. Ex. 3 | ○ | 0.78 | X | X | X | X | X | X | X | X | X | X |
| Com. Ex. 4 | ○ | 0.75 | X | X | X | X | X | X | X | X | X | X |
| Com. Ex. 5 | ○ | 0.76 | X | X | X | X | X | X | X | X | X | X |
| Com. Ex. 6 | ○ | 0.78 | X | X | X | X | X | X | X | X | X | X |
| Com. Ex. 7 | ○ | 0.50 | Δ | Δ | Δ | X | X | Δ | Δ | Δ | X | X |
| Com. Ex. 8 | X | 0.40 | ○ | ○ | ○ | ○ | ○ | ○ | ○ | ○ | ○ | ○ |
| Com. Ex. 9 | X | 0.52 | ○ | ○ | ○ | ○ | ○ | ○ | ○ | ○ | ○ | ○ |

As can be seen from Table 2, the films of Comparative Examples 1 to 6 which do not comprise a coat layer on the surface, exhibited inferior adhesive properties, slipping properties, water resistance and sticking properties. The films of Comparative Examples 7 to 9 having coatings of WR901, acrylic resin containing conventional melamine hardener and aqueous polyurethane, respectively, showed inferior physical properties including adhesive properties.

In contrast, the polyester films of the present invention having coat layers comprising copolymerized polyester showed excellent performance characteristics in all categories of the properties.

Performance Test II

The polyester films manufactured in Examples 1 through 9 were subjected to the following performance tests. The results are shown in Table 3.

(1) Thermal Shrinkage Ratio

A sample film was cut into a 15 mm×200 mm (length) piece, treated in 80° C. water, and the length of the piece was measured, to determine thermal shrinkage ratio by the following formula:

Thermal shrinkage ratio (%)=$[(L-l)/L]\times 100$ wherein L is the length of film before thermal treatment, and l is the length of film after thermal treatment.

(2) Printability

A nitrocellulose ink was spread over the surface of a film sample and a predetermined grid pattern was printed using a razor blade. A semitransparent tape having an adhesive strength of 40 g/mm was pressed on the ink-coated surface of the film. The printability was evaluated by the amount of ink transferred onto the tape when peeled off from the surface, according to the following criteria:

○: No ink was transferred onto the tape.

Δ: 70% or less of the ink was transferred onto the tape.

x: 70% or more of the ink was transferred onto the tape.

(3) Wrapping Property over Glass Bottle

A 10 mm×10 mm grid was patterned on a heat-shrinkable film, rolled and shaped into a cylindrical shape having a diameter of 65 mm using tetrahydrofuran(THF). Then, a commercial glass bottle (having a capacity of 334 ml) was wrapped with the cylindrical heat-shrinkable film in 85° C. or 90° C. water. The wrapping was evaluated according to the following criteria:

○: The grid on the glass bottle was undistorted and fitting of the film to the shape of the lid of the bottle was good after shrink-wrapping at 90° C.

Δ: The grid on the glass bottle was undistorted and the fitting of the film to the shape of the lid of the bottle was good after shrink-wrapping at 85° C.

x: The grid was distorted and the fitting of the film to the shape of the lid of the bottle was poor after shrink-wrapping at 85° C.

(4) Extendibility

The appearance and the uniformity in thickness of a film after drawing d, and evaluated according to the following criteria:

○: The film had good uniformity in thickness without whitening.

x: The film became whitened or was non-uniform in thickness.

◇: Evaluation of the extendibility was impossible due to irregular extensibility of the film.

(5) Break Strength

The rupture strength of a film was measured with a tensile strength tester (Model 6021, manufactured by Instron Co.). For measuring the break strength, a 10 cm×15 mm film sample was used.

(6) Haze

The haze of a film sample was measured using a haze tester (Model x1-211, manufactured by Gardner Neotech).

TABLE 3

| Example No. | Shrinkage Ratio (%) | | Printability | Covering property | Extendibility | Break strength (kgf/mm$^2$) | Haze (%) |
|---|---|---|---|---|---|---|---|
| | MD* | TD* | | | | | |
| 1 | −1.9 | 68 | ○ | ○ | ○ | 5.7 | 3.9 |
| 2 | −1.0 | 61 | Δ | Δ | ○ | 6.8 | 3.9 |
| 3 | 0 | 72 | ○ | ○ | ○ | 5.5 | 4.2 |
| 4 | 0 | 72 | ○ | ○ | ○ | 5.2 | 4.7 |
| 5 | 0.8 | 72 | ○ | ○ | ○ | 5.4 | 5.2 |
| 6 | 1.1 | 65 | ○ | Δ | ○ | 4.9 | 5.3 |
| 7 | −1.8 | 68 | ○ | ○ | ○ | 5.7 | 4.0 |
| 8 | −1.9 | 69 | ○ | ○ | ○ | 5.7 | 3.9 |
| 9 | −1.9 | 69 | ○ | ○ | ○ | 5.8 | 4.2 |

*MD and TD indicate the shrinkage ratios in the machine direction and in the transverse direction, respectively, of the films.

As shown in Table 3, the heat-shrinkable polyester films manufactured in Examples 1 through 9 in accordance with the present invention exhibit excellent thermal shrinkage ratio, printability, extendibility, break strength, adhesiveness and transparency. Thus, the inventive heat-shrinkable films having such desirable properties can be advantageously used for the purpose of labeling or wrapping a variety of containers.

While the invention has been described with respect to the above specific embodiments, it should be recognized that various modifications and changes may be made to the invention by those skilled in the art which also fall within the scope of the invention as defined by the appended claims.

What is claimed is:

1. A heat-shrinkable polyester film comprising a polyester base film and a coat layer formed on one or both sides of the polyester base film, wherein said coat layer comprises a copolymerized polyester having carboxyl group terminals and $T_g$ in the range of 70 to 80° C., and is formed in an amount ranging from 0.01 to 0.1 g/m² on the base film surface.

2. The heat-shrinkable polyester film of claim 1, wherein said copolymerized polyester is copolymerized using a dicarboxylic acid selected from the group consisting of terephthalic acid, an ester thereof, isophthalic acid, an ester thereof, 2,6-naphthalenedicarboxylic acid, an ester thereof, sebacic acid, adipic acid, sodium 5-sulfoisophthalate, trimellitic acid, oxalic acid, maleic acid, succinic acid, glutaric acid, pimelic acid, azelaic acid, pyromellitic acid and a mixture thereof; and a diol component selected from the group consisting of ethylene glycol, 1,3-propanediol, diethylene glycol, hexanediol, 2,2-(4-oxyphenol)propanediol derivatives, xylene glycol, triethylene glycol, poly-tetramethylene glycol, 2,2'-oxybis(ethanol), 2,2-dimethyl(-1,3-propane)diol and a mixture thereof.

3. The heat-shrinkable polyester film of claim 1, wherein said polyester base film further comprises an inorganic lubricant in an amount of 0.1 to 0.5% by weight based on the copolymerized polyester.

4. The heat-shrinkable polyester film of claim 3, wherein said inorganic lubricant is selected from the group consisting of silica, alumina, titania, calcium carbonate, barium sulfate and a mixture thereof.

5. The heat-shrinkable polyester film of claim 1, wherein said polyester base film comprises a trimethylene terephthalate repeating unit.

6. The heat-shrinkable polyester film of claim 5, wherein said polyester base film further comprises ethylene terephthalate and 2,2-dimethyl (-1,3-propylene)terephthalate repeating units.

7. The heat-shrinkable polyester film of claim 6, wherein the content of said trimethylene terephthalate repeating unit is in the range of 5 to 25% by mole, the content of said ethylene terephthalate repeating unit is in the range of 45 to 90% by mole, and the content of said 2,2-dimethyl(-1,3-propane)terephthalate repeating unit is in the range of 5 to 30% by mole.

8. The heat-shrinkable polyester film of claim 6, wherein the polyester base film is prepared by blending a polytrimethylene terephthalate, a polyethylene terephthalate and a 2,2-dimethyl(-1,3-propane)diol-copolymerized polyester.

9. The heat-shrinkable polyester film of claim 8, wherein the intrinsic viscosities of the polytrimethylene terephthalate and the polyethylene terephthalate are in the ranges of 0.7 to 0.95 and 0.5 to 0.65, respectively.

10. The heat-shrinkable polyester film of claim 8, wherein the 2,2-dimethyl(-1,3-propane)diol-copolymerized polyester is prepared by copolymerizing terephthalic acid or dimethyl terephthalate with a mixture of ethylene glycol and 2,2-dimethyl(-1,3-propane)diol.

11. The heat-shrinkable polyester film of claim 10, wherein the intrinsic viscosity of the 2,2-dimethyl(-1,3-propane)diol-copolymerized polyester is in the range of 0.5 to 0.7.

12. The heat-shrinkable polyester film of claim 10, wherein said 2,2-dimethyl(-1,3-propane)diol-copolymerized polyester comprises 75 to 85% by mole of said ethylene terephthalate repeating unit and 15 to 25% by mole of said 2,2-dimethyl(-1,3-propylene)terephthalate repeating unit.

13. The heat-shrinkable polyester film of claim 5, wherein said trimethylene terephthalate repeating unit is prepared by polymerizing terephthalic acid or dimethyl terephthalate with propanediol.

14. The heat-shrinkable polyester film of claim 13, wherein said dicarboxylic acid component further comprises dimethyl isophthalate and dimethyl-2,6-naphthalenedicarboxylate, and said diol component further comprises 2,2-dimethyl(-1,3-propane)diol and ethylene glycol.

15. The heat-shrinkable polyester film of claim 14, wherein said dicarboxylic acid component comprises 70 to 100% by mole of dimethyl terephthalate, 0 to 20% by mole of dimethyl isophthalate and 0 to 10% by mole of dimethyl-2,6-naphthalenedicarboxylate.

16. The heat-shrinkable polyester film of claim 14, wherein said diol component comprises 5 to 20% by mole of propanediol, 5 to 20% by mole of 2,2-dimethyl(-1,3-propane)diol and 60 to 90% by mole of ethylene glycol.

* * * * *